UNITED STATES PATENT OFFICE.

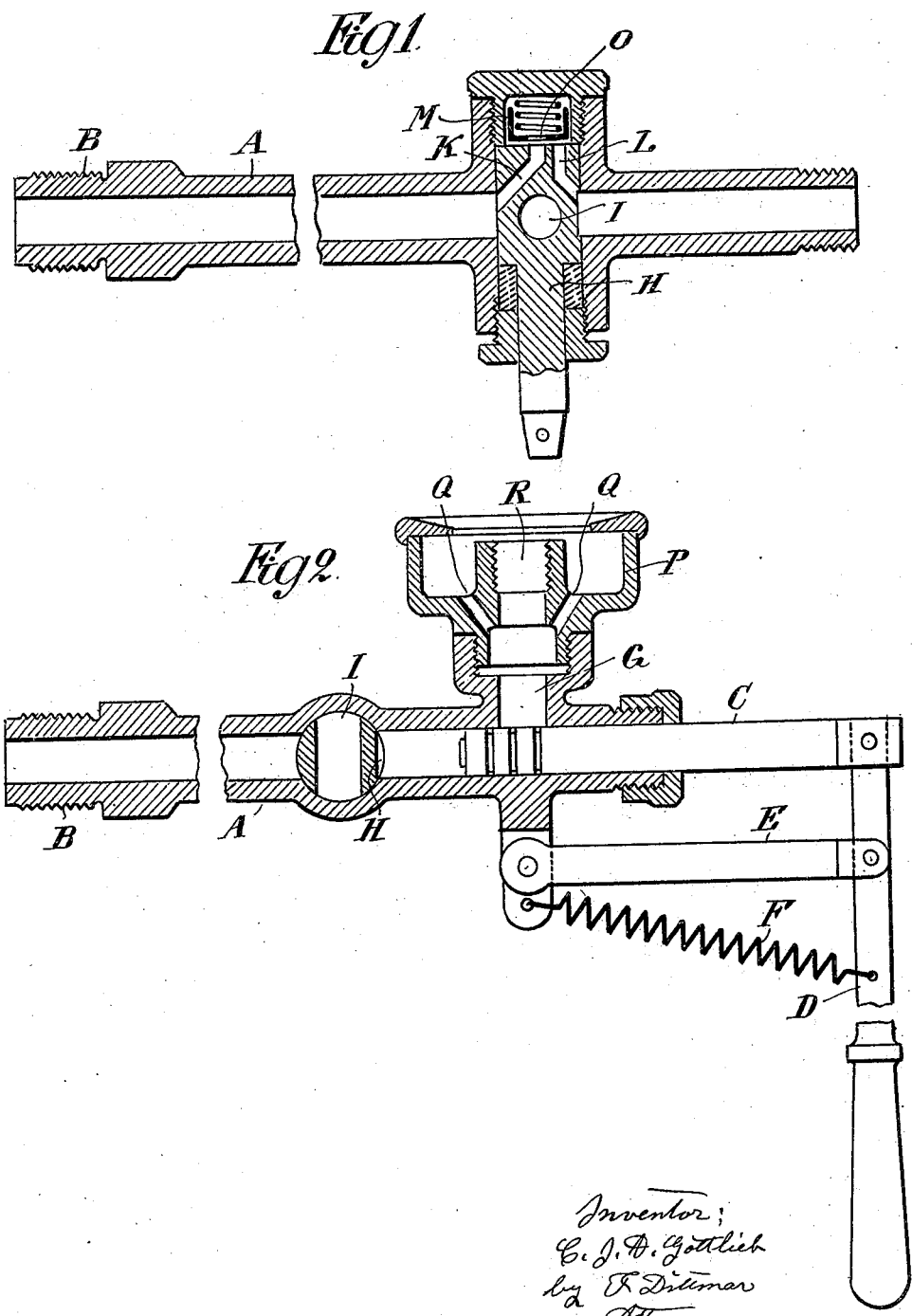

CARL JULIUS ALEXANDER GOTTLIEB, OF AARHUS, DENMARK.

LUBRICATING DEVICE FOR STUFFING-BOXES.

1,395,815.   Specification of Letters Patent.   Patented Nov. 1, 1921.

Application filed February 23, 1921. Serial No. 447,296.

*To all whom it may concern:*

Be it known that I, CARL JULIUS ALEXANDER GOTTLIEB, residing at Dalgas avenue, Aarhus, Denmark, have invented certain new and useful Improvements in Lubricating Devices for Stuffing-Boxes, of which the following is a specification.

The invention relates to lubricating devices for stuffing boxes and more especially for stuffing boxes for piston rods for compressors, and it has for its object to provide such lubricating device with means of enabling it to act both as an ordinary lubricator having the lubricant supplied in drops by gravity from an oil-cup and as a lubricator supplied with lubricant by a force pump.

A constructional form of the invention is illustrated on the drawing in which—

Figure 1 shows a horizontal section through the apparatus with the pump-piston removed, and Fig. 2 the apparatus partially in vertical section.

A is the pump housing, one end B of which is screw-threaded so that it can be screwed into the stuffing-box which shall be lubricated. A pump-piston C is fitted in the other end of the housing A and connected to one end of a two-armed lever D, which turns on a pivot in one end of a link E pivoted to a projection on the housing A, so that the piston C may be reciprocated by oscillating said lever D. A spring F returns the lever to its normal position, in which a hole G for ordinary gravity-feed of the lubricant provided in the wall of the housing A is open. In front of said hole the housing A is provided with a cock H having a wide bore I for ordinary gravity-feed and two small bores K and L for pump-feed. The bores K and L open to a closed chamber at the end of the cock H which chamber is provided with a spring actuated valve M which ordinarily closes the bore L leading to the supply end of the housing end, and which valve is provided with a hole O corresponding to the bore K, which leads to the distributing end of the housing A.

Over the hole G is mounted a ring-shaped cup P serving as a reservoir for the lubricant and communicating with the hole G through channels Q. The counterpart R of the cup P is hollow and provided with screw threads for an oil-cup (not shown) from which the lubricant is supplied in drops.

The operation of the device is as follows:

1. When the cock H is in the position shown on the drawing the lubricant can only be supplied to the stuffing box by the pump. In this case the lubricant from the cup P is forced by the pump piston C through the bore L and as the valve M opens through the bore K to the stuffing-box.

2. When the cock H is turned 90° there will be free passage from the lubricant from the oil-cup through the holes R and G and the bore I of the cock to the stuffing-box. In this position of the cock H the tightness of the stuffing-box may be controlled by filling the cup P with oil through which then air eventually escaping from the stuffing-box, will bubble.

I claim:—

In a lubricating device for stuffing boxes, a tube adapted for connection with a stuffing-box and normally in free communication with an oil cup for the feed of the lubricant, a cock dividing said tube into a supply and delivery side, a reciprocatory pump piston fitted in the supply side of said tube and normally held in the rear of the oil-supply opening, and a cock having a bore for ordinary gravity feed and force feed bores, and a spring-actuated valve normally closing said force feed bores when the cock is turned to close the gravity feed bore.

In testimony whereof I affix my signature.

CARL JULIUS ALEXANDER GOTTLIEB.